United States Patent
Setlak

(10) Patent No.: US 9,367,173 B2
(45) Date of Patent: Jun. 14, 2016

(54) FINGER SENSOR HAVING PIXEL SENSING CIRCUITRY FOR COUPLING ELECTRODES AND PIXEL SENSING TRACES AND RELATED METHODS

(71) Applicant: Apple Inc., Cupertino, CA (US)

(72) Inventor: Dale R. Setlak, Melbourne, FL (US)

(73) Assignee: APPLE INC., Cupertino, CA (US)

( * ) Notice: Subject to any disclaimer, the term of this patent is extended or adjusted under 35 U.S.C. 154(b) by 659 days.

(21) Appl. No.: 13/743,706

(22) Filed: Jan. 17, 2013

(65) Prior Publication Data

US 2013/0181949 A1 Jul. 18, 2013

Related U.S. Application Data

(60) Provisional application No. 61/587,523, filed on Jan. 17, 2012.

(51) Int. Cl.
*G06F 3/042* (2006.01)
*G06K 9/00* (2006.01)

(52) U.S. Cl.
CPC .............. *G06F 3/042* (2013.01); *G06K 9/0002* (2013.01)

(58) Field of Classification Search
CPC ......... G09G 3/36; G06F 3/044; G06F 3/0421; G06F 3/042; G06F 3/017; G06F 3/041
See application file for complete search history.

(56) References Cited

U.S. PATENT DOCUMENTS

| | | | |
|---|---|---|---|
| 5,940,526 A | 8/1999 | Setlak et al. | |
| 5,953,441 A | 9/1999 | Setlak | |
| 6,088,471 A | 7/2000 | Setlak et al. | |
| 6,289,114 B1 | 9/2001 | Mainguet | |
| 6,628,812 B1 | 9/2003 | Setlak et al. | |
| 6,927,581 B2 | 8/2005 | Gozzini | |
| 7,361,919 B2 | 4/2008 | Setlak | |
| 7,606,398 B2 | 10/2009 | Nysaether et al. | |
| 7,697,281 B2 | 4/2010 | Dabov et al. | |
| 7,697,729 B2 | 4/2010 | Howell et al. | |
| 7,715,593 B1 | 5/2010 | Adams et al. | |
| 7,734,068 B2 | 6/2010 | Fisher | |
| 7,809,168 B2 | 10/2010 | Abiko et al. | |
| 7,809,211 B2 | 10/2010 | Taraba et al. | |
| 7,848,550 B2 | 12/2010 | Mathiassen et al. | |
| 8,005,276 B2 | 8/2011 | Dean et al. | |
| 8,145,916 B2 | 3/2012 | Boshra et al. | |
| 2004/0230810 A1 | 11/2004 | Hillhouse | |

(Continued)

FOREIGN PATENT DOCUMENTS

EP 1315119 5/2003

*Primary Examiner* — Michael Faragalla
(74) *Attorney, Agent, or Firm* — Allen, Dyer, Doppelt, Milbrath & Gilchrist, P.A.

(57) ABSTRACT

A finger sensor may include pixels, pixel sensing traces each associated with a respective pixel, and electrodes overlying the pixel sensing traces. The finger sensor may also include pixel sensing circuitry coupled to the pixel sensing traces and the electrodes. The pixel sensing circuitry may be capable of operating in a measurement mode by operating the pixels so that at least some of the pixels are active, and at least some other of the pixels are inactive and coupling pixel sensing traces associated with the inactive pixels to a voltage reference. The pixel sensing circuitry may also be capable of operating in the measurement mode by coupling electrodes associated with the active pixels to the voltage reference and coupling electrodes associated with the inactive pixels to a drive signal.

16 Claims, 10 Drawing Sheets

(56) References Cited

U.S. PATENT DOCUMENTS

| | | | |
|---|---|---|---|
| 2005/0156660 A1* | 7/2005 | Van Blerkom | G05F 1/56 327/541 |
| 2006/0097991 A1* | 5/2006 | Hotelling et al. | 345/173 |
| 2008/0069413 A1 | 3/2008 | Riedijk et al. | |
| 2008/0219522 A1 | 9/2008 | Hook | |
| 2009/0083850 A1 | 3/2009 | Fadell et al. | |
| 2009/0316963 A1 | 12/2009 | Boshra | |
| 2010/0082444 A1 | 4/2010 | Lin et al. | |
| 2010/0321158 A1 | 12/2010 | Setlak et al. | |
| 2011/0102567 A1 | 5/2011 | Erhart | |
| 2011/0102569 A1 | 5/2011 | Erhart | |
| 2011/0175703 A1* | 7/2011 | Benkley, III | 340/5.82 |
| 2012/0085822 A1 | 4/2012 | Setlak et al. | |

* cited by examiner

FINGER SENSOR HAVING PIXEL SENSING CIRCUITRY FOR COUPLING ELECTRODES AND PIXEL SENSING TRACES AND RELATED METHODS

RELATED APPLICATION

The present application is based upon previously filed copending provisional application Ser. No. 61/587,523, filed Jan. 17, 2012, the entire subject matter of which is incorporated by reference in its entirety.

FIELD OF THE INVENTION

The present invention relates to the field of electronics, and, more particularly, to the field of fingerprint sensors.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. No. 5,953,441 to Setlak and assigned to the assignee of the present invention, the entire contents of which are herein incorporated by reference. The fingerprint sensor is an integrated circuit sensor that drives the user's finger with an electric field signal and senses the electric field with an array of electric field sensing pixels on the integrated circuit substrate.

U.S. Pat. No. 6,289,114 to Mainguet, which is assigned to the assignee of the present invention and is incorporated in its entirety by reference discloses a fingerprint sensor that includes a finger sensing integrated circuit (IC). The finger sensing IC includes a layer of piezoelectric or pyroelectric material placed between upper and lower electrodes to provide electric signals representative of an image of the ridges and valleys of the fingerprint.

A particularly advantageous approach to multi-biometric fingerprint sensing is disclosed in U.S. Pat. No. 7,361,919 to Setlak, which is assigned to the assignee of the present invention and is incorporated in its entirety by reference. The Setlak patent discloses a multi-biometric finger sensor sensing different biometric characteristics of a user's finger that have different matching selectivities.

A fingerprint sensor may be particularly advantageous for verification and/or authentication in an electronic device, and more particularly, a portable device, for example. Such a fingerprint sensor may be carried by the housing of a portable electronic device, for example, and may be sized to sense a fingerprint from a single-finger. For example, the AES3400 sensor from AuthenTec, Inc. of Melbourne, Fla., is widely used in a variety of notebooks, desktops and PC peripherals. Other fingerprint sensors, for example, the AES850, also from AuthenTec, Inc. of Melbourne, Fla., is a multi-function smart sensor that expands touch-based functionality of touchscreen and QWERTY smartphones with a reduced impact on sensor performance or durability.

When using a semiconductor fingerprint sensor, or integrated circuit fingerprint sensor, in a portable electronic device, for example, a mobile telephone, it may be desirable to locate the integrated circuit of the fingerprint sensor separately from the finger sensing region. Separating the finger sensing integrated circuit (IC) from the finger sensing area may be particularly advantageous when the finger sensing area is relatively thin and transparent so that it may be placed over the top of a display of the portable electronic device, and wherein the IC may be located in a nearby non-display region of the portable electronic device.

A relatively high quality electronic fingerprint sensor includes the finger sensing region directly above the IC of the fingerprint sensor. In the current art, a lower quality fingerprint sensor may operate with the finger sensing area region separated from the IC, but the fingerprint sensor often may experience problems operating in the display region. The lower quality fingerprint sensor is typically unable to capture fingerprint images through a relatively thick protective cover used over the display regions of portable electronic devices. Thus, the images that are captured are more noisy and lower quality, which may lead to unacceptable biometric performance.

U.S. Pat. No. 8,005,276 to Dean et al. discloses a fingerprint sensing circuit for reducing noise and parasitic capacitive coupling. A fingerprint sensing area including transmitting and receiving elements may be physically decoupled from the fingerprint sensing circuit. Positioning the sensing elements off the silicon die may improve the reliability of the fingerprint sensor by reducing the sensor's susceptibility to electrostatic discharge, wear, and breakage.

U.S. Patent Application Publication No. 2011/0102569 to Erhart discloses a fingerprint sensor that includes multiple fingerprint sensor lines on a surface of an LCD. The LCD is covered on an opposite surface with motion sensing lines.

SUMMARY OF THE INVENTION

In view of the foregoing background, it is therefore an object of the present invention to provide a finger sensor that can generate a reduced noise finger measurement from a finger, for example, positioned in a finger sensing area at a relatively large distance from the finger sensing integrated circuit.

This and other objects, features, and advantages in accordance with the present invention are provided by a finger sensor that may include a plurality of pixels, a plurality of pixel sensing traces each associated with a respective pixel, and a plurality of electrodes overlying the plurality of pixel sensing traces. The finger sensor may also include pixel sensing circuitry coupled to the plurality of pixel sensing traces and the plurality of electrodes. The pixel sensing circuitry may be capable of operating in a measurement mode by operating the plurality of pixels so that at least some of the plurality of pixels are active, and at least some other of the plurality of pixels are inactive and coupling pixel sensing traces associated with the inactive pixels to a voltage reference. The pixel sensing circuitry may also be capable of operating in the measurement mode by coupling electrodes associated with the active pixels to the voltage reference and coupling electrodes associated with the inactive pixels to a drive signal. Accordingly, the finger sensor may generate a reduced noise finger measurement, for example, by reducing interference generated from a finger positioned in a finger sensing area at a relatively large distance from the finger sensing integrated circuit.

The pixel sensing circuitry may be further capable of operating in a shielding mode by coupling the plurality of pixel sensing traces and the plurality of electrodes to the voltage reference. The finger sensor may further include a finger sensing integrated circuit (IC) coupled to the plurality of pixels sensing traces, for example.

The plurality of electrodes may each have a length shorter than a respective length of each of the plurality of pixel sensing traces, for example. The plurality of pixels may include a plurality of electric field sensing pixels.

The finger sensor may further include a dielectric substrate carried between the plurality of pixel sensing traces and the plurality of electrodes. The finger sensor may also include a dielectric cover overlying the plurality of electrodes.

A method aspect is directed to a method of finger sensing using a finger sensor that may include a plurality of pixels, a plurality of pixel sensing traces each associated with a respective pixel, and a plurality of electrodes overlying the plurality of pixel sensing traces. The method may include operating the finger sensor in a measurement mode by operating the plurality of pixels so that at least some of the plurality of pixels are active, and at least some other of the plurality of pixels are inactive, and coupling pixel sensing traces associated with the inactive pixels to a voltage reference. The method may also include operating the finger sensor in the measurement mode by coupling electrodes associated with the active pixels to the voltage reference, and coupling electrodes associated with the inactive pixels to a drive signal.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in different embodiments.

Figure 1:
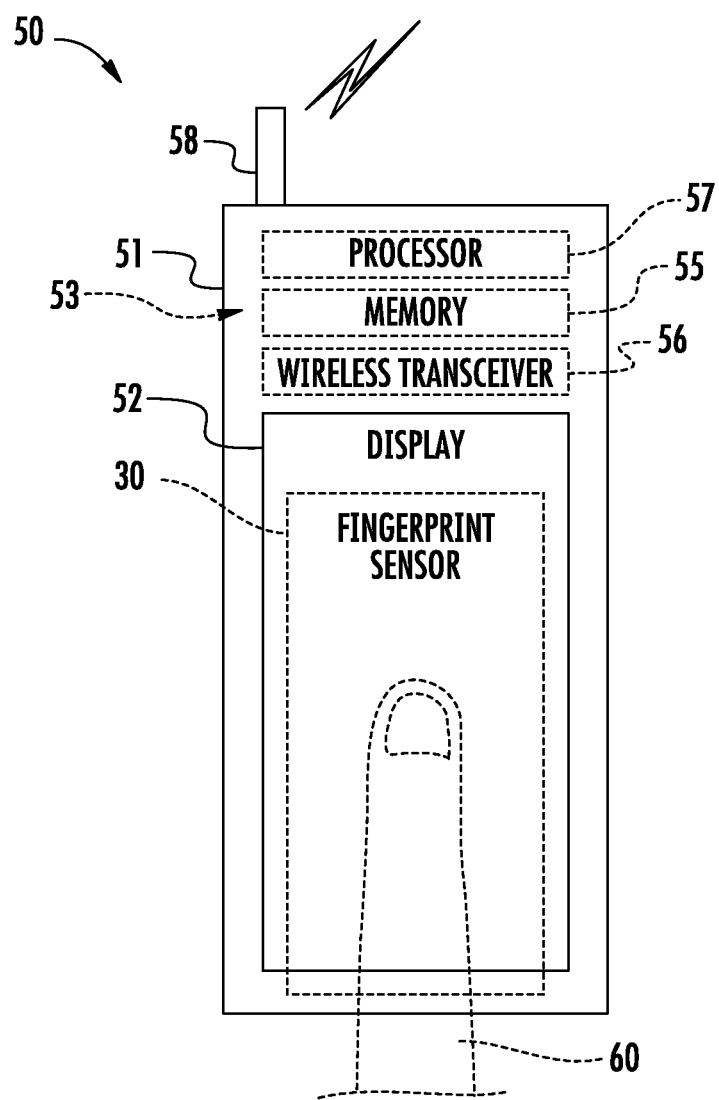
FIG. 1 is a schematic plan view of an electronic device including a fingerprint sensor for use with a touchscreen display in accordance with the present invention.

Referring initially to FIG. 1, an embodiment of a fingerprint sensor 30 in accordance with the present invention is now described. The fingerprint sensor 30 is illustratively mounted in a stacked relation with or part of a display 52. There is no array of input keys, as the display 52 is a touchscreen display so inputs are provided via the display. Of course, the fingerprint sensor 30 can also be used with other portable or stationary electronic devices.

The electronic device 50 includes a housing 51, the display 52 carried by the housing, and circuitry 53 also carried by the housing and connected to the display and to the fingerprint sensor 30. In some embodiments, an array of input keys are also provided and, where, for example, the electronic device 50 is in the form of a cellphone, may be used for dialing and other applications as will be appreciated by those skilled in the art.

The circuitry 53 may include a processor 57 and memory 55 coupled thereto, for example. The circuitry 53 may also include a wireless transceiver 56 configured to perform wireless communications functions, for example, voice and/or data communications. An antenna 58 is illustratively carried by the housing 51 and is coupled to the wireless transceiver 56.

Of course, the fingerprint sensor 30 may also include circuitry embedded therein and/or in cooperation with the circuitry 53 to provide menu navigation and selection functions, tactile feedback, and/or power up functions as will be appreciated by those skilled in the art. In some embodiments, as will be described in further detail below, the fingerprint sensor 30 may be carried by or positioned in a staked relation with the display 52, for example, for a touch screen display.

Figure 2:
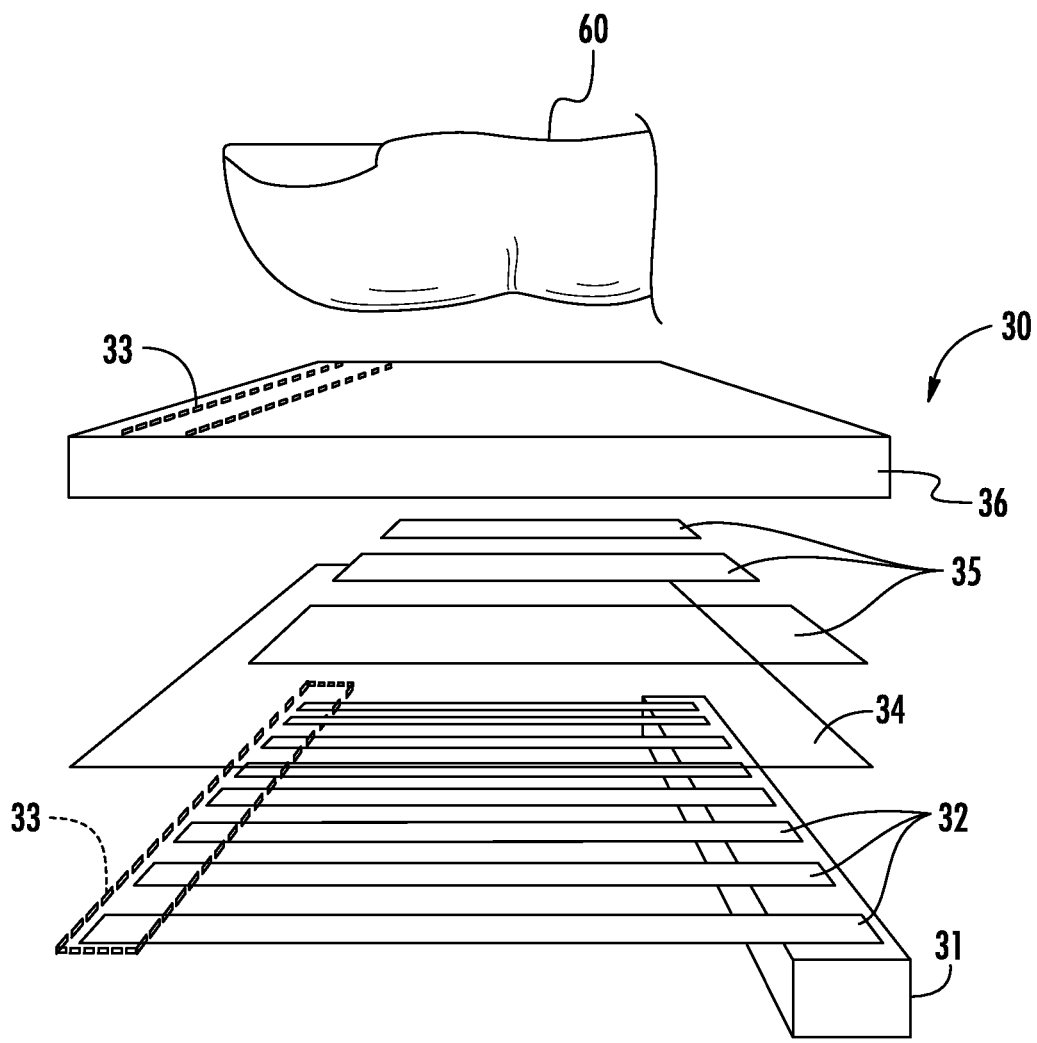
FIG. 2 is an exploded view of the fingerprint sensor of FIG. 1.

Referring additionally to FIG. 2 the fingerprint sensor 30 includes a fingerprint sensor integrated circuit (IC) 31. Pixel sensing traces 33 are illustratively coupled to the fingerprint sensor IC 31 and extend outwardly therefrom to define a first metallization layer. As will be appreciated by those skilled in the art, for ease of explanation, the fingerprint sensor 30 illustrated in FIG. 2 includes one linear row of finger sensing pixels (each finger sensing pixels pixel corresponding to a respective pixel sensing trace 33). Of course, the fingerprint sensor 30 may include any number of rows and columns of pixels and pixel sensing traces to define an array of finger sensing pixels. Alternatively or additionally, other configurations may include more than one fingerprint sensor and/or staggered arrangements of finger sensing pixels. The finger sensing pixels may be configured in other spatial relations.

A substrate 34 is carried by the pixel sensing traces 33. More particularly, the substrate 34 is carried on top of or over the pixel sensing traces 33. The substrate 34 is a dielectric substrate that may be transparent.

Drive/shield electrodes 35 are carried by the substrate 34. Each drive/shield electrode 35 may function either as a finger drive electrode, or a trace shield electrode. The drive/shield electrodes 35 are carried on top of the substrate 34 and define a second metallization layer. In some embodiments, the drive/shield electrodes 35 may be optional. Structurally, the pixel sensing traces 33 are located below and insulated from the drive/shield electrodes 35. The drive/shield electrodes 35 are shorter in length than the pixel sensing traces 33. In other words, each of the pixel sensing traces 33 extends beyond an end of the drive/shield electrodes 35. The exposed ends of the pixel sensing traces 33 define a finger sensing area 32.

The pixel sensing traces 33 and drive/shield electrodes 35 may include a conductive material that may be a transparent conductive material. For example, the pixel sensing traces 33 and/or the drive/shield electrodes 35 may be indium tin oxide (ITO), which advantageously may allow the finger sensing region to be placed on top of a viewable display region.

An insulating cover 36 may be placed between the drive/shield electrodes and the user's finger 60. The insulating cover 36 may, in some embodiments, be the structural base of the fingerprint sensor 30, for example. The fingerprint sensor 30 may be rigid or flexible and may be shaped and bent to fit into different mounting configurations, for example, for a different size and shape electronic device 50.

In operation, a user's finger 60 is swiped or positioned on top of the drive/shield electrodes 35 in the finger sensing area 32 where the pixel sensing traces 33 are not covered by the drive/shield electrodes.

As will be appreciated by those skilled in the art, it may be particularly desirable to shield the pixel sensing traces 32 from the user's finger 60 (and also other conductive objects) in all areas except in the finger sensing area 32 where the finger measurement is actually taking place. It may also be similarly desirable, while sensing the user's finger 60, to reduce the effects of the parasitic capacitances imposed on the pixel sensing traces 32.

Figure 3:
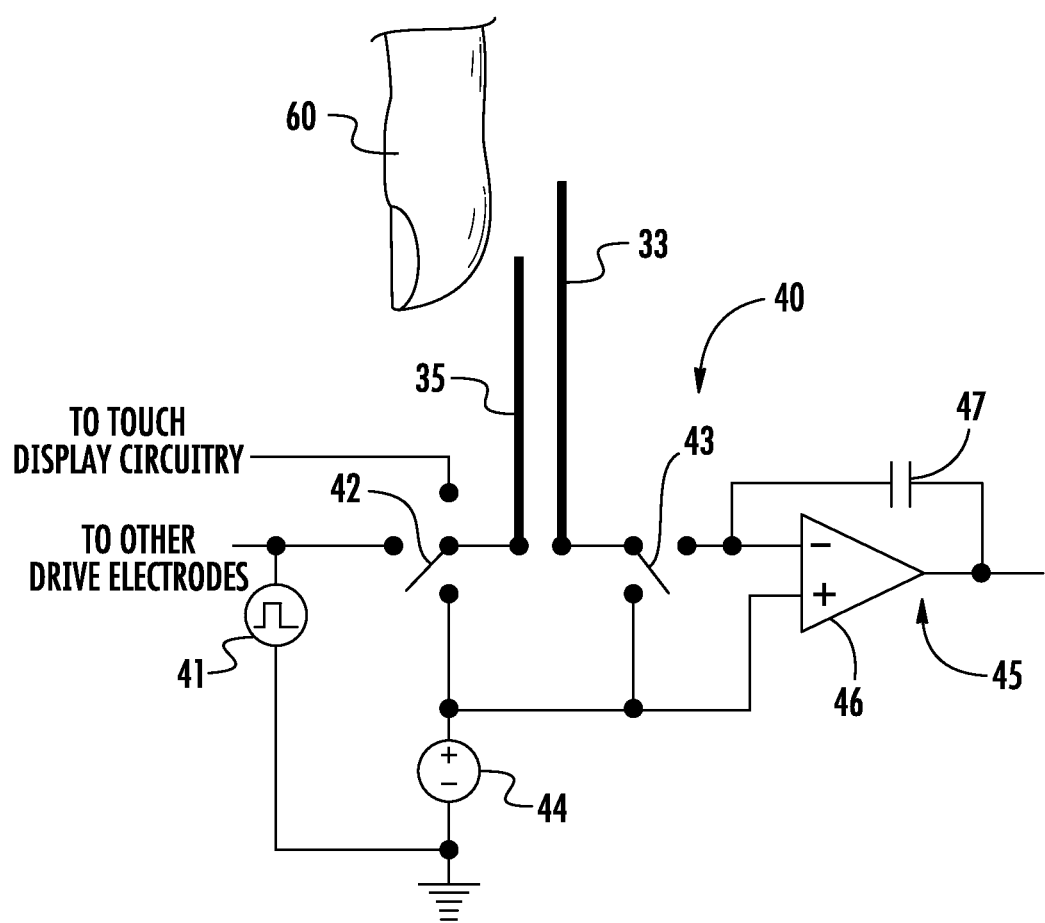
FIG. 3 is a schematic diagram of electric field flux sensing pixel circuit for use with the fingerprint sensor of FIG. 2.

Referring now additionally to FIG. 3, the fingerprint sensor 30 may advantageously achieve this by using electric field flux sensing pixel electronics 40. The electric field flux sensing pixel circuit 40 includes a drive signal source 41 and a voltage reference 44. A first switch 42 selectively couples a drive/shield electrode 35 to one of touch screen display circuitry, a finger drive signal source, and the voltage reference 44. A second switch 43 selectively couples a pixel sensing trace 33 to one of electric field flux sensing electronic components 45 and the voltage reference 44. The electric field flux sensing electronic components 45 are illustratively in the form of an operational amplifier 46 and a feedback coupled capacitor 47.

As will be appreciated by those skilled in the art, the electric field flux sensing pixel circuit 40 may force the sensing electrodes or pixel sensing traces 33 to a fixed reference potential during the measurement. The electric field flux sensing pixel circuit 40 also drives the shield electrodes 35 over active ones of the pixel sensing traces 33 to the fixed reference potential during the measurement, and drives inactive ones of the pixel sensing traces adjacent the active ones of the pixel sensing traces to a fixed reference potential during the measurement.

Except in the finger sensing area 32 where the pixel sensing traces 33 are exposed to the user's finger 60, the active pixel sensing traces are surrounded by conductors at nearly the same potential as the pixel sensing traces, which may effectively nullify the parasitic capacitances. If the finger sensing area 32 is placed over a standard electronic display, such as, for example, a liquid crystal display (LCD) or light emitting diode (LED) display, the ground plane on the top of the display may also act as a shield underneath the pixel sensing traces 33.

In a fingerprint sensing operation, a group of the finger sensing pixels is placed in an active measurement mode, and the switchable drive/shield electrode 35 above that group of pixels would be put into a shielding mode for the duration of that measurement step. One or more of the shield/drive electrodes 35 that is, during the measurement, not over any of the active pixels would be put into the finger drive mode, in which an excitation signal would be applied to the drive/shield electrode, and hence coupled into the user's finger 60. As the finger sensing pixels, i.e., the array of finger sensing pixels, are scanned, the switchable drive/shield electrodes 35 are switched between the drive mode and the shield mode.

The electric field flux sensing pixel circuit 40 advantageously implements electric field flux sensing pixels with the pixel sensing traces 33 being switchable to the reference voltage when not being measured, and switchable drive/shield electrodes 35. The first and second switches 42, 43 switch the drive/shield electrodes 35 to be used as touch-screen electrodes, for example, when the fingerprint capture function of the system is not in use.

As will be appreciated by those skilled in the art, some problems involved in extending the finger sensing area 32 away from the finger sensing IC 31 may include limiting the finger-sensitive region of the pixel sensing traces 33 to an area typically much smaller than the pixel sensing traces themselves, and shielding the pixel sensing traces from external interference. Other problems may include reducing the effects of stray capacitive loading of the pixel sensing traces 33 and reducing the effects of crosstalk between adjacent pixel sensing traces.

One approach for addressing the above-noted problems may be to limit the region that is sensitive to a user's finger 60. In the fingerprint sensor 30, the region sensitive to the user's finger 60, i.e., the extended portion of the pixel sensing traces 33 may be limited by placing the drive/shield electrodes 35 over the pixel sensing traces so that a relatively small area of the pixel sensing traces are uncovered, and thus able to capture a signal from the user's finger 60.

Another approach for addressing the above-noted problems includes shielding the pixel sensing traces 33. The drive/shield electrodes 35 also shield the pixel sensing traces 33 from external electrical interference. When the fingerprint sensor 30 is positioned over the display 52 or display region, such as, for example, an LCD or LED display, the ground (or common) electrode that is the top electrically active layer of these devices is beneath the pixel sensing traces 33 and may act as a shield against external electric interference. Alternatively a third conductive layer, appropriately insulated, may be placed beneath the pixel sensing traces 33 for shielding.

Still further, another approach for addressing the above-noted problems includes reducing the effects of stray capacitance. In other fingerprint sensors, for example, as in the prior art, pixel sensing traces can be loaded by their parasitic capacitances to the shield electrodes and to adjacent pixel traces. The electric field flux sensing circuit 40 advantageously operates by holding the pixel sensing traces 33 at a voltage about equal to the reference voltage of the amplifier 46. By holding the adjacent conductors at that same reference voltage during the measurement, no charge may move through those parasitic capacitances and hence has little effect on the ultimate measurement.

Yet another approach for addressing the above-noted problems includes reducing crosstalk between pixels. Electrical crosstalk between adjacent pixel sensing traces 33 can cause errors and loss of resolution. Crosstalk between pixels can be caused by capacitive coupling or inductive coupling. By forcing the pixel sensing traces 33 (both active and inactive) to remain at the same reference potential, no capacitive energy transfer between pixels can take place, hence capacitive crosstalk is reduced.

In inductive crosstalk, currents flowing in one pixel sensing trace 33 induce a voltage in adjacent pixel sensing traces. The induced crosstalk voltage is based upon the first derivative (rate of change) of the inducing current. Most excitation waveforms used in sensing (e.g., a step waveform) cause the current in the pixel sensing trace 33 to initially increase, and then decrease as the charge on the flux sensor balances. Since the induced voltage follows the derivative of the current, the voltage may have one polarity during the time the current is increasing and the opposite polarity during the time the current is decreasing. If the flux sensors' amplifiers integrate over the full pixel charging period, the induced crosstalk signal integrates to a value very close to zero. Hence the effects of inductive crosstalk may be reduced.

Figure 4:
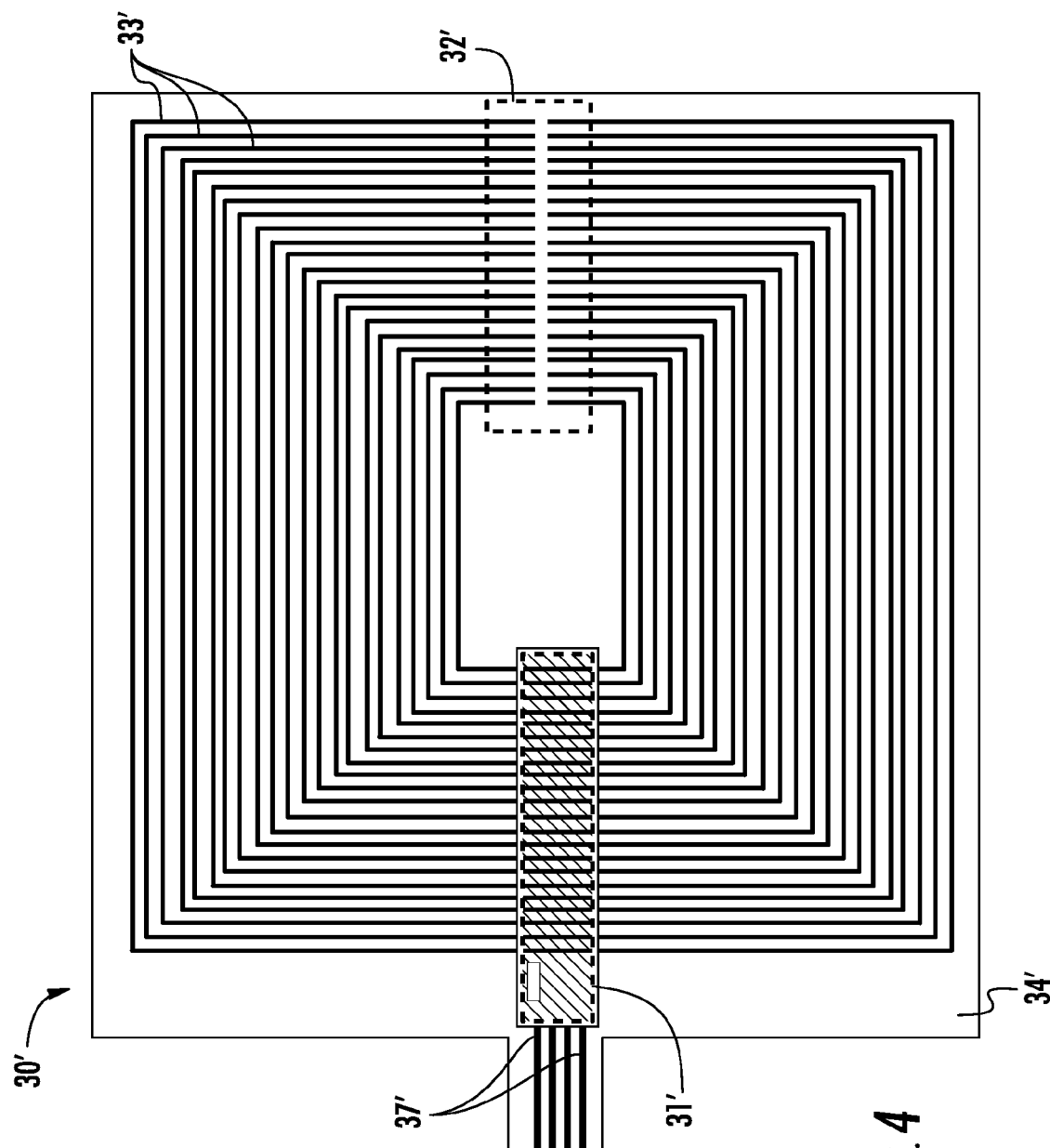
FIG. 4 is a bottom view of a fingerprint sensor according to another embodiment of the present invention.
Figure 5:
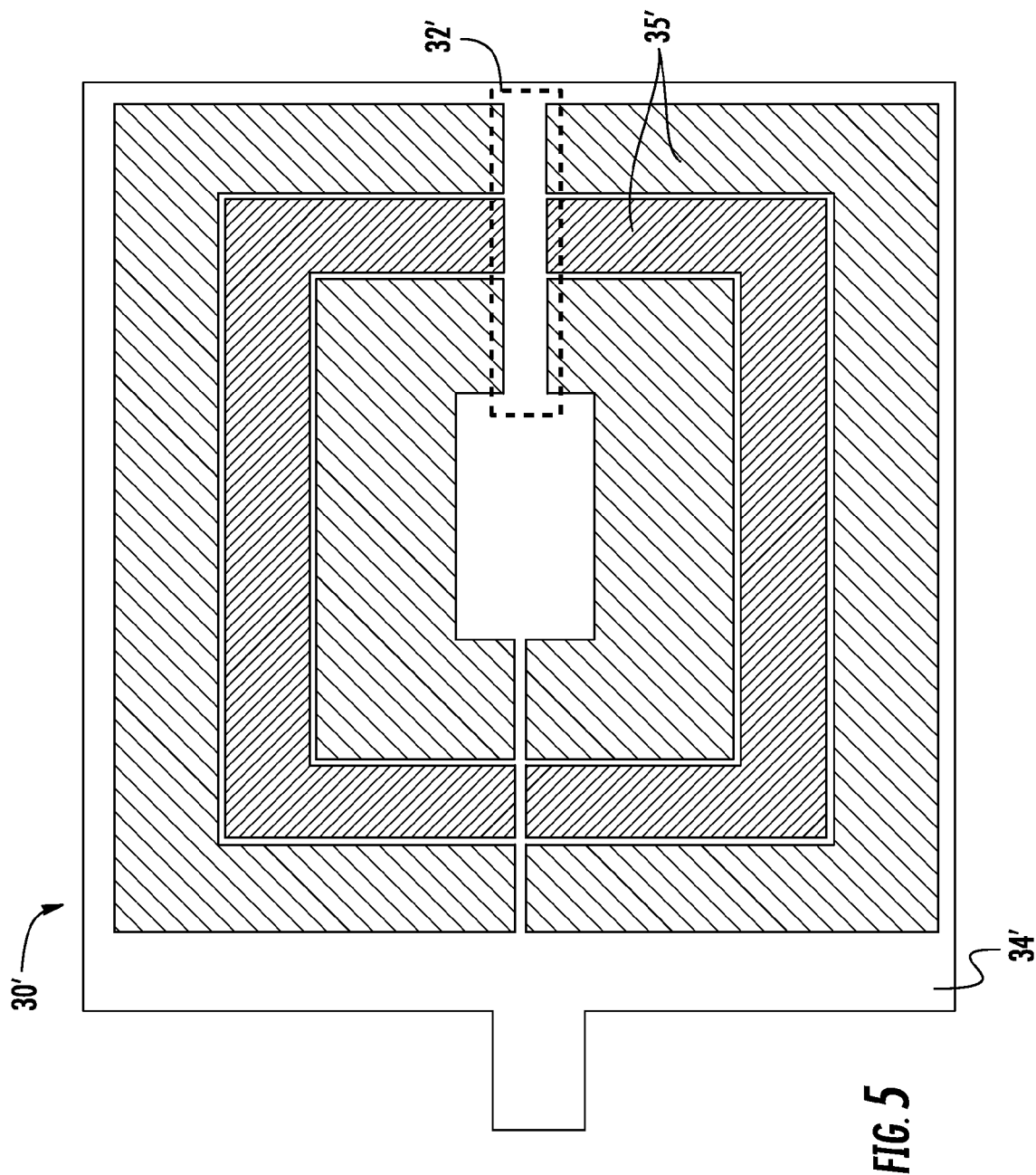
FIG. 5 is a top view of the fingerprint sensor of FIG. 4.
Figure 6:
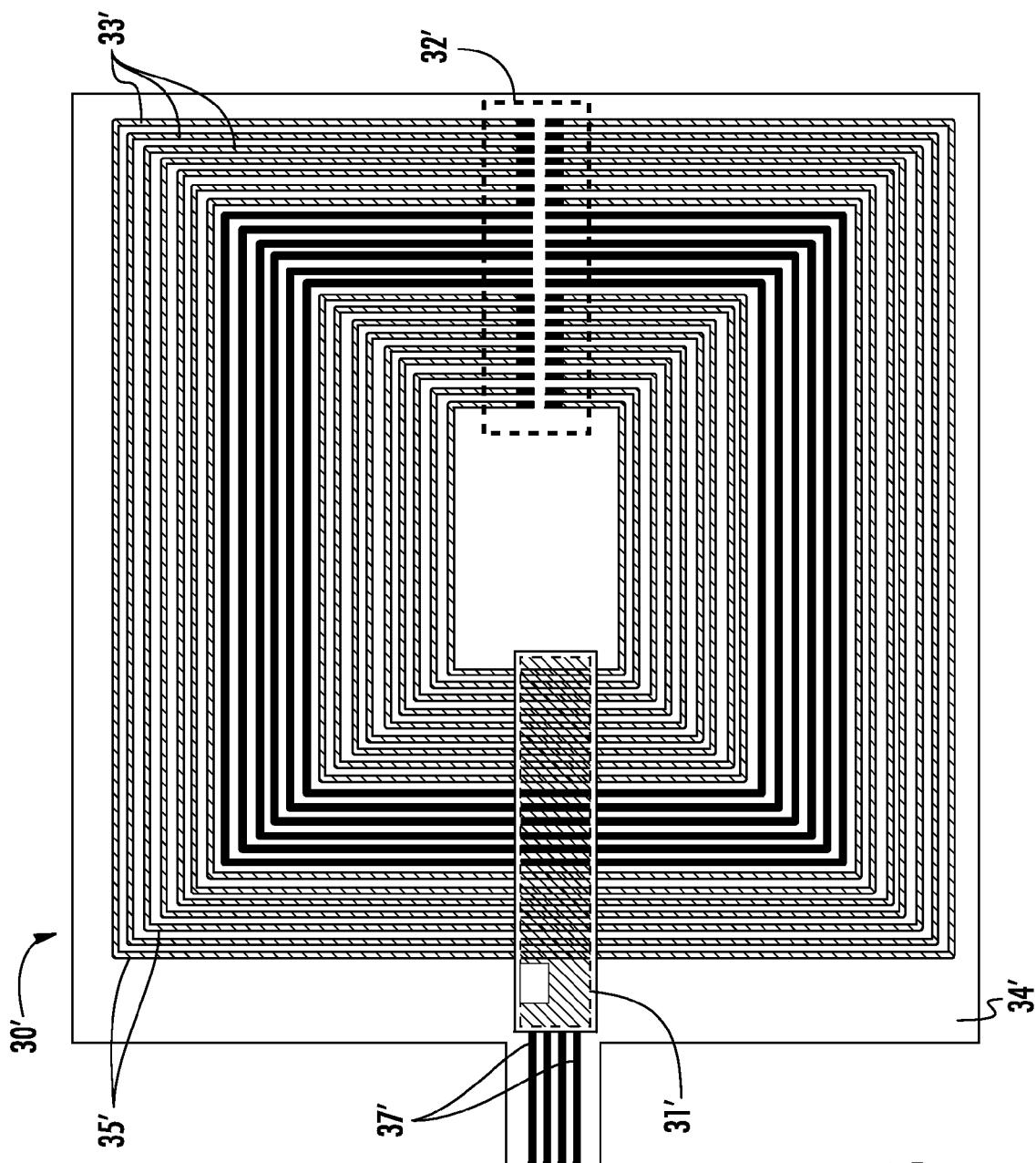
FIG. 6 is a combined top and bottom view of the fingerprint sensor of FIGS. 4 and 5.

Referring now to FIGS. 4-6, another embodiment of a fingerprint sensor 30' is illustrated. The pixel sensing traces 33' and the fingerprint sensor IC 31' are bonded to a thin insulating substrate 34'. Power and signal connections for the fingerprint sensor 30' are on bond pads 37'. The finger sensing area 32' is defined by two rows of pixels with the pixel sensing traces 33' routed to the finger sensing area at both the top and the bottom. The first or lower metalization layer is beneath the layer of finger drive/shield electrodes 35'.

The switchable finger drive/shield electrodes 35' are bonded to the top of the thin insulating substrate 34' (FIG. 5). In this example there are six different electrodes that can be switched to perform the functions of finger drive, or finger shield as desired. The overlaid relationship of the drive/shield electrodes 34' and the pixel sensing traces 33' is illustrated in FIG. 6.

Illustratively, the finger sensing area 32' is structured as two parallel linear rows of pixels. When the user's finger 60 moves across the array or the pixels, image frames two rows high can be captured. Known methods of finger movement estimation, image reconstruction, and image normalization can be applied to the two row geometry. For example, some of these methods are disclosed in U.S. Pat. No. 7,809,211, to Taraba et al., having a common assignee, and the entire contents of which are herein incorporated by reference.

Figure 7:
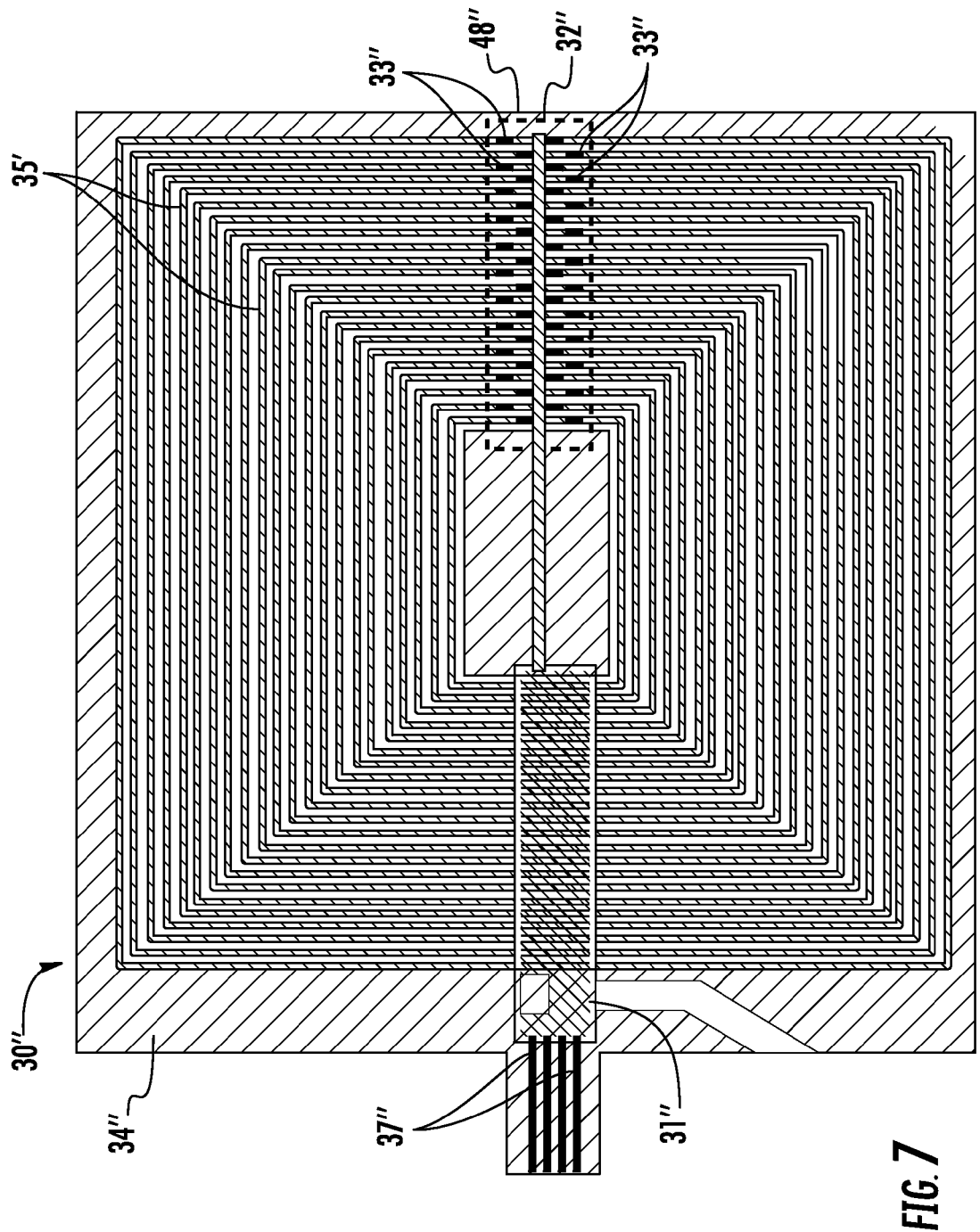
FIG. 7 is a bottom view of a fingerprint sensor according to another embodiment of the present invention.
Figure 8:
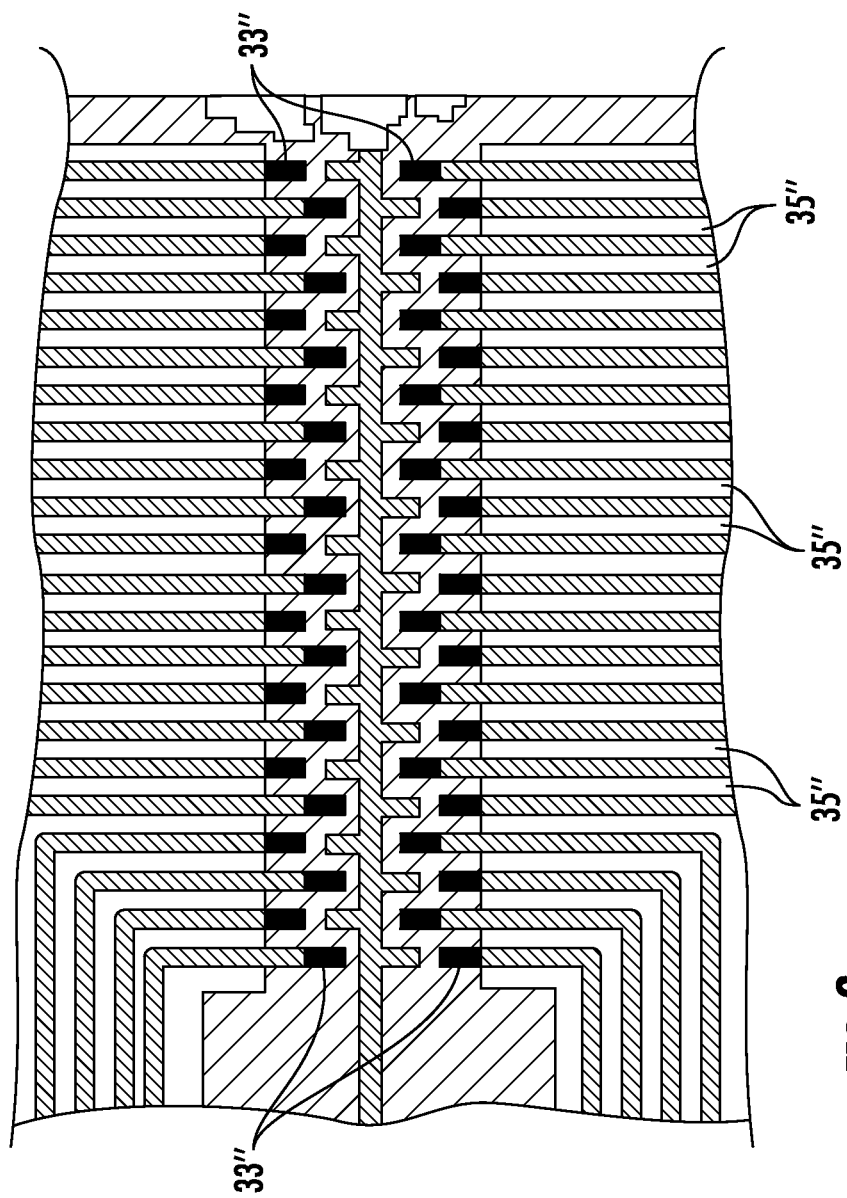
FIG. 8 is a greatly enlarged view of a portion of the fingerprint sensor of FIG. 7.

Referring now additionally to FIGS. 7 and 8, different alternate sensing region array geometries are also possible. The finger sensing pixel array has four rows of pixels in the finger sensing area 32" in a staggered pattern. This type of sensor pattern can often be used with simpler and more robust finger movement estimation methods than the two row pattern, for example.

The four rows of pixels are separated into two pairs to illustrate the use of an optional field smoothing electrode 48" between the upper and lower pairs of rows. Of course, the four rows of pixels may be spaced at even distances vertically. Use of a field smoothing electrode 48" may improve the consistency of the pixel signals, but this may generally occur at the cost of changing the spacing between the rows. The value of this trade-off may depend upon the finger movement estimating methods used to reconstruct the finger image, as will be appreciated by those skilled in the art.

The drive/shield electrodes 35 "are shaped to follow the staggered pixel pattern. Indeed, is may also be possible to build structures where the pixel sensing traces 33" approach the finger sensing area 32" from the same direction. For example, the bottom half of FIG. 6, by itself may be used as a two row sensor. Elaborating on this design, it is also possible to build geometries where switching of the finger drive/shield electrodes 35" may not be desired. If all electrodes approach the finger sensing area 32" from one direction as discussed above, an unswitched finger drive electrode can be placed on the other side of the finger sensing area. This approach may be used in certain circumstances where the one sided geometry can be supported.

The fingerprint sensor 30 described herein may allow a variety of different types of measurements to be made. In the simplest system, each pixel sensing trace 33 may be measured and its signal becomes the pixel value of that location in the resulting fingerprint image frame. In one alternative approach, 2-dimensional differential signals may be acquired by making differential measurements between adjacent pixels both horizontally and vertically. The resulting signals can be beneficially used to construct more accurate fingerprint images as described in U.S. application Ser. No. 13/269,316 to Setlak et al., having a common assignee, and the entire contents of which are herein incorporated by reference.

It is worthy of noting that prior art fingerprint sensing systems having the finger sensing area separate from the sensor IC are generally not capable of accurately performing 2-dimensional differential measurements, which severely limits image quality capability in this regard.

In some situations it may be desirable to have the finger sensing area as part of a standard touch screen display, for example. In those cases, when the fingerprint function is not active, it may be desirable for the fingerprint sensing region to function as a normal part of the touch sensing user input area. Typical touch sensing mechanisms use an array of capacitive sensing plates to locate the position of the finger on the display. The touch sensing pixels are much larger than fingerprint sensing pixel. Thus, the electrodes used for finger drive/shield purposes in fingerprint sensing can be also used as touch sensing pixels when the fingerprint reading function is inactive.

Figure 9:
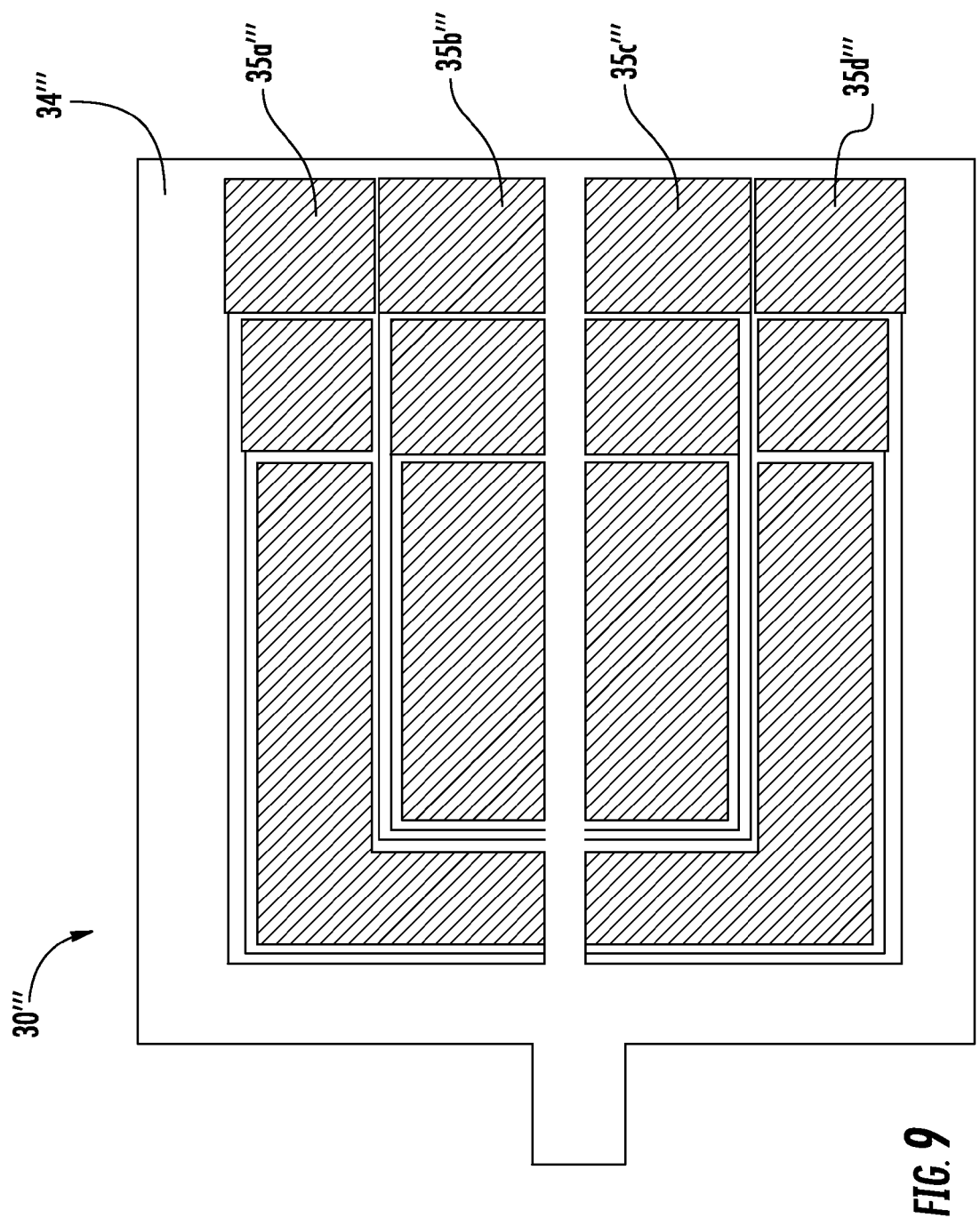
FIG. 9 is a plan view of a drive/shield electrode arrangement of a fingerprint sensor in accordance with an embodiment of the present invention.
Figure 10:
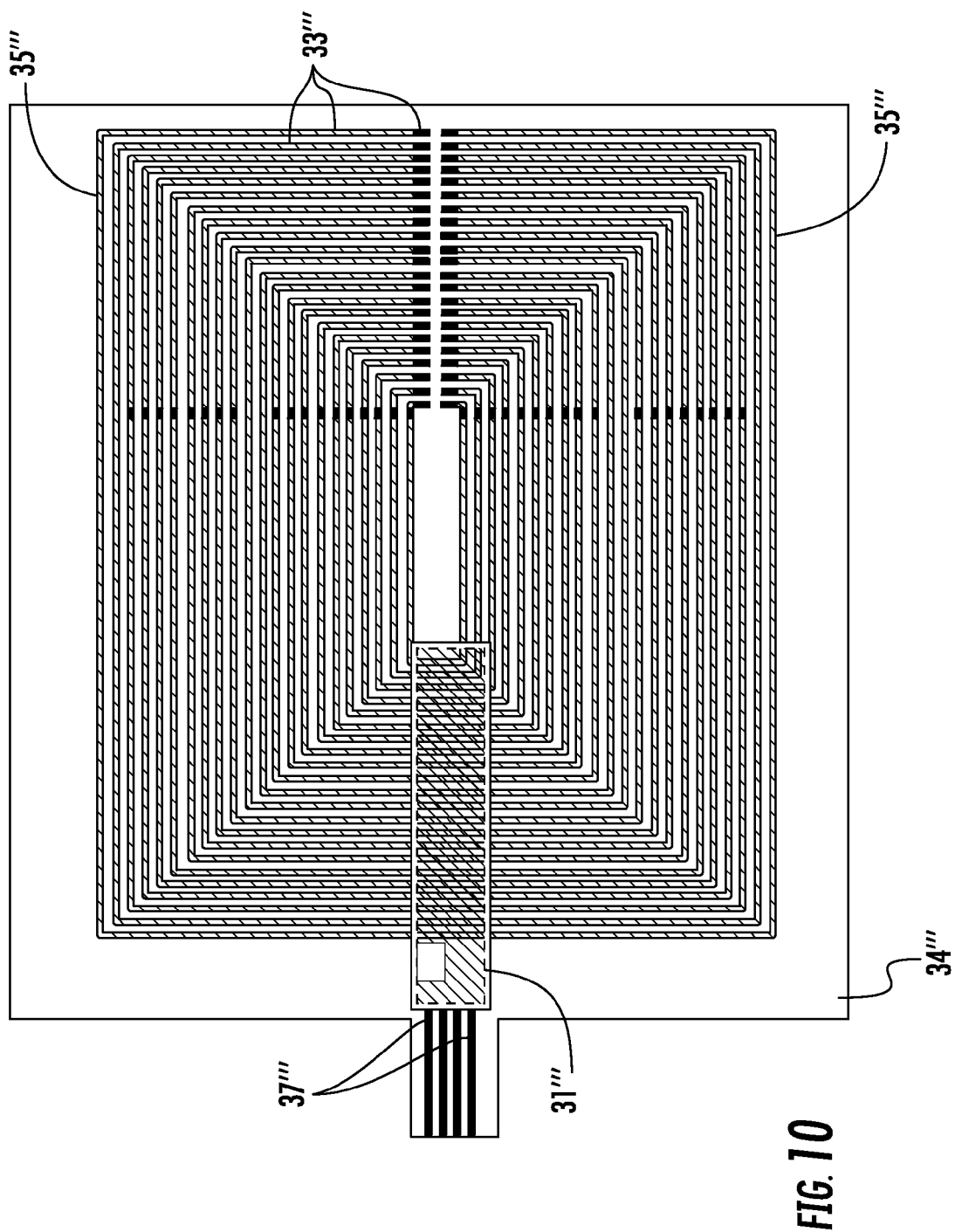
FIG. 10 is a top plan view of an arrangement of a conductive layer of the touchscreen display and the pixel sensing traces of an electronic device in accordance with an embodiment of the present invention.

Referring now to FIGS. 9 and 10, another embodiment may allow the drive/shield electrodes 35''' around the finger sensing area 32''' to function as sensing elements in a capacitive touchscreen sensing system when the fingerprint capture function is inactive. The four electrodes 35$a$'''-35$d$''' act as capacitive touch sensor pixels. The area around the fingerprint sensing IC 31''' would be off to the side of the active touchscreen area and may not participate in the touch sensing function. FIG. 10 shows this drive/shield electrode structure over the top of an arrangement of pixel sensing traces 33'''.

A related method may include a method of making a finger sensor as described above. Another method aspect may be directed to a method of sensing a fingerprint, for example, through a display, as described above.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the present invention.

That which is claimed is:

1. A finger sensor comprising:
   a plurality of pixels;
   a plurality of pixel sensing traces each associated with a respective pixel;
   a plurality of electrodes overlying said plurality of pixel sensing traces;
   pixel sensing circuitry coupled to said plurality of pixel sensing traces and said plurality of electrodes, the pixel sensing circuitry comprising
   at least one gain stage,
   a plurality of first switches coupled to the plurality of electrodes and being switchable among a voltage reference, display circuitry, and a drive signal source,
   a plurality of second switches coupled to pixel sensing traces and switchable between the voltage reference and the at least one gain stage, and
   a controller coupled to the plurality of first and second switches and capable of operating at least some of the plurality of pixels in an active mode by coupling the plurality of pixel sensing traces to the at least one gain stage and corresponding ones of said plurality of electrodes between one of the voltage reference and the drive circuitry.

2. The finger sensor of claim 1 wherein the pixel sensing circuitry is capable of operating at least some other of the plurality of pixels in an inactive mode by coupling the plurality of pixel sensing traces to the voltage reference and the plurality of electrodes to the drive signal source.

3. The finger sensor of claim 1 wherein said plurality of electrodes each has a length shorter than a respective length of each of said plurality of pixel sensing traces.

4. The finger sensor of claim 1, wherein said plurality of pixels comprises a plurality of electric field sensing pixels.

5. The finger sensor of claim 1 further comprising a dielectric substrate carried between said plurality of pixel sensing traces and said plurality of electrodes.

6. The finger sensor of claim 1, further comprising a dielectric cover overlying said plurality of electrodes.

7. An electronic device comprising:
a housing;
a display carried by the housing and having display circuitry associated therewith; and
a finger sensor carried by said housing and comprising
a plurality of pixels,
a plurality of pixel sensing traces each associated with a respective pixel,
a plurality of electrodes overlying said plurality of pixel sensing traces, and
pixel sensing circuitry coupled to said plurality of pixel sensing traces and said plurality of electrodes, the pixel sensing circuitry comprising
at least one gain stage,
a plurality of first switches coupled to the plurality of electrodes and being switchable among a voltage reference, display circuitry, and a drive signal source,
a plurality of second switches coupled to pixel sensing traces and switchable between the voltage reference and the at least one gain stage, and
a controller coupled to the plurality of first and second switches and capable of operating at least some of the plurality of pixels in an active mode by coupling the plurality of pixel sensing traces to the at least one gain stage and corresponding ones of said plurality of electrodes between one of the voltage reference and the drive circuitry.

8. The electronic device of claim 7 wherein the pixel sensing circuitry is capable of operating at least some other of the plurality of pixels in an inactive mode by coupling the plurality of pixel sensing traces to the voltage reference and corresponding ones of the plurality of electrodes to the drive signal source.

9. The electronic device of claim 7 wherein said display comprises a touch screen display.

10. The electronic device of claim 7 wherein said plurality of electrodes each has a length shorter than a respective length of each of said plurality of pixel sensing traces.

11. The electronic device of claim 7 wherein said plurality of pixels comprises a plurality of electric field sensing pixels.

12. The electronic device of claim 7 further comprising a dielectric substrate carried between said plurality of pixel sensing traces and said plurality of electrodes.

13. The electronic device of claim 7 further comprising a dielectric cover overlying said plurality of electrodes.

14. A method of finger sensing using a finger sensor comprising a plurality of pixels, a plurality of pixel sensing traces each associated with a respective pixel, and a plurality of electrodes overlying the plurality of pixel sensing traces, the method comprising:
selectively operating a plurality of first switches to couple the plurality of electrodes among a voltage reference, display circuitry, and a drive signal source; and
selectively operating a plurality of second switches to couple a pixel sensing trace between the voltage reference and at least one gain stage;
at least some of the plurality of pixels being operated in an active mode by coupling the plurality of pixel sensing traces to the at least one gain stage and corresponding ones of the plurality of electrodes between one of the voltage reference and the drive circuitry.

15. The method of claim 14 wherein at least some other of the plurality of pixels are operated in an inactive mode by coupling the plurality of pixel sensing traces to the voltage reference and the plurality of electrodes to the drive signal source.

16. The method of claim 14 wherein the plurality of electrodes each has a length shorter than a respective length of each of the plurality of pixel sensing traces.

* * * * *